United States Patent [19]

Schluger

[11] E Patent Number: Re. 33,503

[45] Reissued Date of Patent: Dec. 25, 1990

[54] CONTAINER FOR PRODUCT SAMPLES

[76] Inventor: Allen Schluger, 21 W. 68th St., New York, N.Y. 10023

[21] Appl. No.: 447,047

[22] Filed: Dec. 7, 1989

Related U.S. Patent Documents

Reissue of:

[64] Patent No.: 4,711,348
Issued: Dec. 8, 1987
Appl. No.: 855,330
Filed: Apr. 24, 1986

[51] Int. Cl.[5] ..... B65D 77/00

[52] U.S. Cl. ..... 206/45.29; 206/459; 206/523; 206/232

[58] Field of Search ..... 206/45.29, 523, 459, 206/233, 45.33, 486; 229/92.8, 87 R

[56] References Cited

U.S. PATENT DOCUMENTS

| | | | |
|---|---|---|---|
| 1,454,849 | 5/1923 | Ganz | 206/45.29 |
| 1,879,105 | 9/1932 | Corigliano | 206/45.29 |
| 2,351,378 | 6/1944 | Weissman | 206/45.29 |
| 2,830,697 | 4/1958 | Paige | 206/45.29 |
| 3,469,765 | 9/1969 | Mueller | 206/45.29 |
| 3,900,100 | 8/1975 | Girman | 206/45.29 |
| 4,093,010 | 6/1978 | Hunley et al. | 206/523 |
| 4,369,882 | 1/1983 | Schluger | 206/523 |

*Primary Examiner*—Joseph Man-Fu Moy

[57] ABSTRACT

A container for use in mailing product samples is formed from a flat blank sheet of cardboard, pasteboard, or similar material delineating a central display panel and a central bottom panel, a first interconnecting panel contiguous with the upper edge of the central display panel and the lower edge of the central bottom panel, a tab extending from the lower edge to the control display panel and a second interconnecting panel extending from the upper edge of the central bottom panel, a pair of side panels extending from the lateral edges of the central bottom panel, and a pair of lateral side wing panels extending from the lateral side edges of the central display panel. The blank is adapted to be folded along the edges and having the second interconnecting side panel adhesively secured to the tab to form a box bounding a compartment beneath the central display panel closable by the side panels and having the wing panels foldable in overlapping relationship over the central display panel. A foam block is sized and positioned in the compartment. The block has at least one recess for a product sample registering with a cut-out in the central display panel. The blank is adapted in its flat condition for application of imprinting, decoration and application of indicia simultaneously on all ultimately visible surfaces within the central display and bottom panels and the side and interconnecting panels so that registration across the opposite side edges is automatically effective.

6 Claims, 4 Drawing Sheets

CONTAINER FOR PRODUCT SAMPLES

Matter enclosed in heavy brackets [ ] appears in the original patent but forms no part of this reissue specification; matter printed in italics indicates the additions made by reissue.

BACKGROUND OF THE INVENTION

The present invention relates to a paperboard shipping and display container and, in particular, to the combination of a paperboard outer container and an inner filler member provided with cavities by which full size or sample size products are securely held when the container is in closed or in open condition.

Representative of the conventional shipping and display containers is that shown in the U.S. Pat. No. 3,799,332. In this patent, a container is constructed from a single unitary blank folded into a rectangular box-like body having an open windowed top panel to one longitudinal edge of which is hinged a lid member. The side panels are openable so as to permit a foam plastic filler body to be inserted therein. The filler body is provided with cavities in which various products are held so as to be visible through the open top panel. The top, bottom, and lid members of the container are arranged in the blank, one above the other in vertical direction and are folded along parallel fold lines to form the box.

While the arrangement shown in U.S. Pat. No. 3,799,332, is simple to form as a blank, and to erect in the box configuration, there are several disadvantages to its construction, which, not incidentally, hold for the comparable conventional prior art.

Namely:

1. There is limited display space provided either when the lid is closed or when the lid is opened, there being only the single lid available for imprinting.

2. The available space for decorative art work to visually enhance the product is also limited, not only by the lack of the available space, but also by the fact that when space is provided, it is made up of small isolated sections, i.e., only the front and back surfaces of the lid which are not contiguous.

3. The display space within the container is also limited by the fact that the top panel member is opened completely so as to form a large window in which the filler body is inserted and in which the product is held. As a result, the upper panel is useless for additional printed or decorative matter.

4. While the container may function as a mailer or shipping container it is, in fact, weak in that its single lid must be sealed about its entire periphery to insure sufficient strength as well as to insure that the filler body will remain in position.

5. The container does not provide a convenient receptacle or pocket for any additional advertising material, such as brochures or order forms, which additional material, if furnished at all, must be laid directly on the sample panels between the filler body and the lid where it may prove harmful to the product samples and well as being easily subjected to loss.

It is, therefore, an object of the present invention to provide a combined sample shipping and display container which overcomes each of the foregoing disadvantages and which provides a container which is simple, inexpensive, and easily decorated, as well as being efficient for display purposes and advertising purposes. It is a further object of the present invention to provide a paperboard blank capable of forming the above novel container.

These objects as well as other objects will be apparent from the following disclosure in which they will both be described and noted in detail, and will be clearly recognizable to the reader.

SUMMARY OF THE INVENTION

According to the present invention a cardboard blank is provided which can be folded into a box for use in shipping and displaying product samples, comprising a central display panel and a central bottom panel, each delineated by upper and lower edges and opposite side edges and including a gluing tap extending from the lower edge and interconnected plural panels extending from the upper edge, which are adapted to be folded along the upper edge and beneath the central display panel to be adhesively secured to the gluing tab to thereby form a box bounding a hollow compartment beneath the central display panel. The blank also includes a pair of lateral side panels contiguous with the central display panel, which when folded form lateral wings for the box. A foam block is positioned in the compartment. The central display panel and the foam block are provided with corresponding openings and recesses for positioning a product sample therein. The lateral extending side panels are opposite, in contiguous relation to the central display panel, presenting additional surfaces on opposite sides of the central display for imprinting product information, and are adapted to be folded in overlapped relation over the central display panel and to be opened to present a continuous display of its surfaces in adjacent relation to the central panel on opposite sides of said surface of said central panel. Thus, any imprinting for the display can be applied simultaneously to the blank in the flat and when the blank is folded it will be automatically in registration across the central and the opposite side panels.

Additional facing panels for imprinting extend from a laterally oriented edge of each of side wings and may be adhesively secured in folded relation to the underside of each side wings, whereby in the overlapped relation of said side panels imprinting on these facing panels contributes to the display of the box. Preferably, at least one of the additional facing panels are adhesively secured only along three edges with the side wings so as to form a pocket for a removable insertion of an instruction or order card associated by imprinting thereon with the product sample. Additionally, it is preferred one side wing have perforations along its edge connection with the central display panel to facilitate the removal thereof and subsequent commercial use as a mailing envelope.

Full details of the present invention are set forth in the following description are illustrated in the accompanying drawings.

DESCRIPTION OF THE INVENTION

Figure 1:
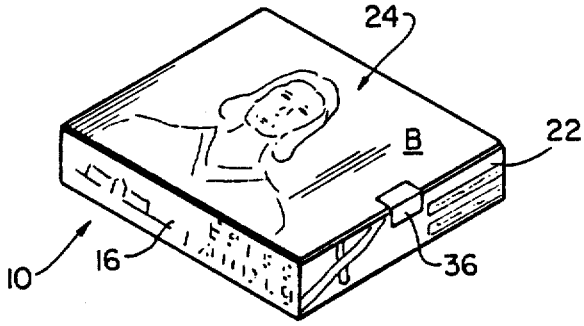
FIG. 1 is a top perspective of the container of the present invention.

A general description of the shipping and display container of the present invention will be first given in connection with FIGS. 1–4. The details by which pasteboard stock is converted into a fully printed and erected container, including the filler body, is best described and seen from FIGS. 5–18, which will be described later. It is noted, however, that in all of the drawings, the phantom lines consisting of long dashes alternating with two smaller dashes illustrate die cuts; long dashes alternating with single short dashes illustrate folds; a series of short dashes illustrate perforations.

Turning now to FIGS. 1–4 the shipping and display container comprises a parallelepiped box generally depicted by the numeral 10, consisting of a top or central display panel 12, a bottom central panel 14, a front side panel 16, a rear side panel 18, a left lateral side panel 20, a right side panel 22, and a pair of lateral panels or wings 24 and 26 which are adapted to fold over each other and over the central display panel 12. The left and right side panels 20 and 22 are openable to permit insertion within the box 10 of a unitary foam plastic filler block 28 in which one or more cavities 30 are formed. Corresponding cutouts 32 are formed in the central display panel of the box 10 so that product samples 34 may be inserted and held within the cavities 30 of the filler block.

As seen the lateral wings 24 and 26 extend contiguously from and continuous with the central display panel 12 and are, in fact, imprinted on their upper and lower faces A and B, respectively. The imprinting on the upper faces A being, as will be later described more fully, continuous with the imprinting on the central display panel 12. The lateral wings 24 and 26 are folded so as to lie one over the other, thereby covering the product samples with a double lid, so as to protect the samples more fully and to provide a strong and sturdy container for shipping purposes. The container is sealed by a tab 36 or either sealing member or method.

As will be described later, the two faces A and B of each lateral wing are formed of two sheet members joined unitarily along the lower edge 38 and glued to each other along the remaining peripheral edges, except that the upper edge 40 of the right lateral wing is left at least partially open so as to form a pocket 42 within the wing, into which an order card 44 or other brochure may be enclosed. As shown in the drawings, the B surface of the left lateral wing 24 becomes the main decorative outer surface of the container, thereby allowing the right lateral wing to be held securely within the container. Thus, the vertical edge between the right lateral wing 26 and the central display panel 12 member can be provided with a series of perforations 46 which allow the right lateral wing 26 to be torn from the central display panel 12 permitting it to be imprinted and provided as a reply envelope in which the order card 44 becomes an essential ingredient. The customer need only remove the lateral wing 26, complete the order card 44, inserting it into the now formed reply envelope and sealing it with a peelable self-sticking seal 48 which is provided on the lateral wing surface 26.

Figure 2:
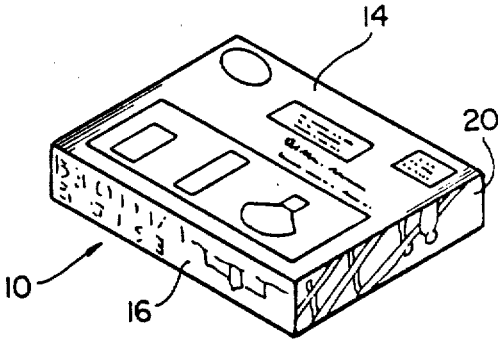
FIG. 2 is a bottom perspective view of the container of the present invention shown in closed condition.
Figure 4:
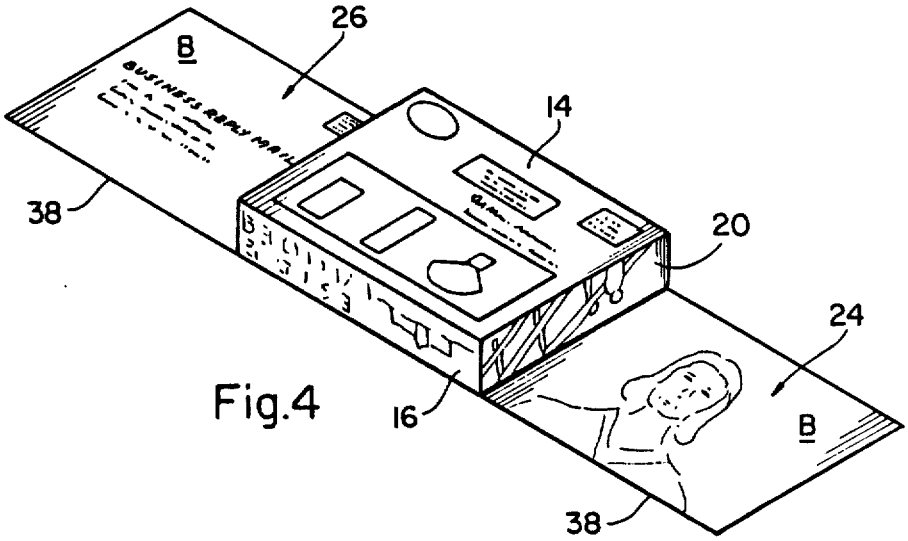
FIG. 4 is a bottom perspective view of the open container shown in FIG. 3.

Since the lower surface B of the left lateral wing 24 is the main decorative outer surface of the container, the bottom central panel 14 is left free to become the mailing address face, and may, thus, be imprinted with appropriate spaces for the sender's return address, mailing label, and postage as clearly seen in FIGS. 2 and 4 together with any additional or other decorative or advertising artwork as may be desired.

Figure 5:
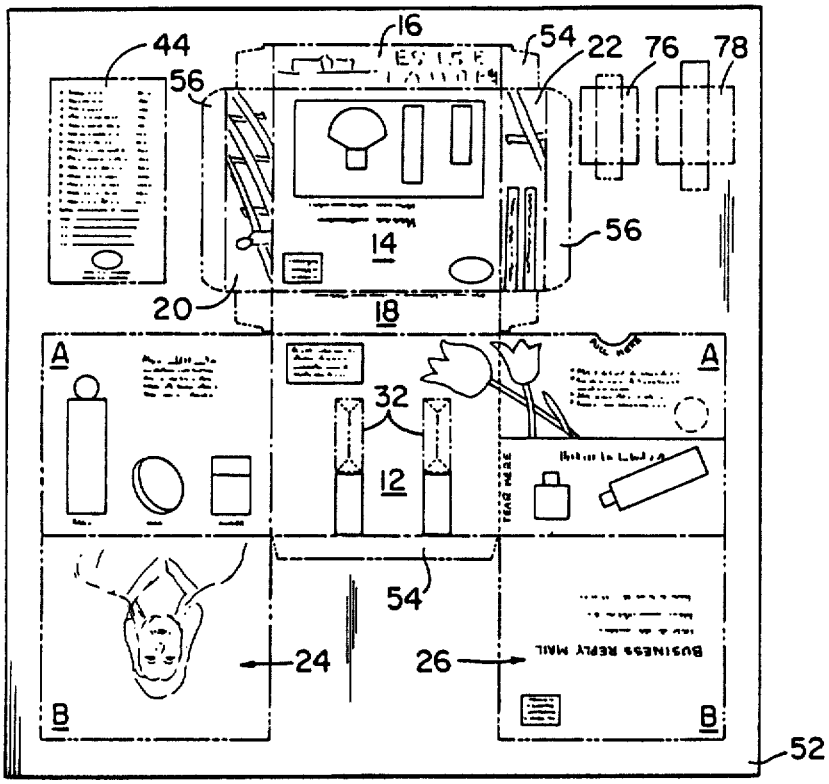
FIG. 5 is a top plan view of the blank from which the container of the present invention is formed.
Figure 6:
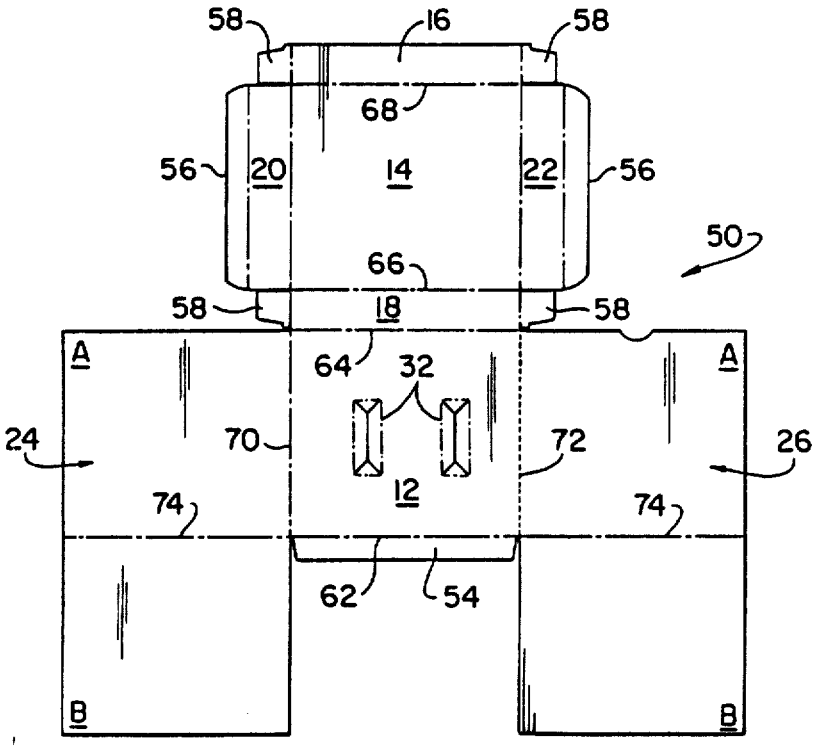
FIG. 6 is a top plan view of a sheet of stock material showing the imprint of the blank therein prior to the blank shown in FIG. 5 being cut from the sheet.

Turning now to FIGS. 5 and 6, the container of the present invention is formed from a one piece blank generally depicted by the numeral 50 preferably cut from a large sheet of cardboard, pasteboard or similar thin material, generally depicted by the numeral 52 so as to define the top or central panel 12, the bottom central panel 14, the front and rear side panels 16 and 18, the right and left side panels 20 and 22, as well as both surface members A and B of the lateral wings 24 and 26, all bearing the same numerals as in FIGS. 1 to 4. In addition, the blank 50 includes a glue flap 54, contiguous with the free edge of the central display panel lower edge as shown, or could be interchanged with panel 18 and those panels connected to panel 18. The left and right side panels 20 and 22 each include a flap 56 contiguous along their respective lateral edges and the front and back panels 16 and 18 are each provided with a pair of tuck flaps 58 which are adapted to be folded beneath the lateral side panels 20 and 22.

The blank is arranged so that the central display panel 12, the rear side panel 18, the bottom panel 14 and the front side panel 16 extend serially in line with each other being respectively defined by a series of parallel fold lines 62, 64, 66, 68 respectively. The upper members A of the left and right lateral wings 24 and 26 are formed contiguously with the lateral edges of the central display panel 12 and are delineated by fold lines 70 and 72, which are perpendicular to the fold lines 62 to 68 respectively. The lower surface members B of the left and right lateral wings 24 and 26 respectively are as indicated continuous and contiguous along the fold line 74, defining the edge 38. When it is intended that the right lateral wing 26 is to be easily detachable as a mailing envelope, for example, the fold line 74 is formed as a series of perforations.

As seen in FIG. 5 the blank is formed and separated, preferably by die cutting from a large sheet 52 of cardboard material which may be a discrete rectangular sheet of stock material, or a part of a continuous roll. In either event, the large sheet 52 is preferable because with it, rather than with a precut shaped and formed blank, its passage through a printing press, die cut apparatus and fold scoring machine is greatly facilitated. The exact order of printing, cutting and scoring is immaterial, although it is preferred to do the necessary printing first, particularly if multi-colored artwork is to be included. The form of sheet 52, and the ultimate blank 50 separated from it enables the printing of all of the ultimately visible surfaces at the same time and because of the contiguous position of the central display panel 12 and of the upper surfaces AA of the lateral wings 24 and 26 printing across the fold lines 70 and 72 is possible and decoratively preferable. Similarly, although not so illustrated, printing can be made continuous from the upper surface A to the lower surface BB of the lateral wings 24 and 26 and/or from the bottom panel 14, through the rear side panel 18 to the central display panel 12. This arrangement avoids one of the most vexatious problems inherent in conventional prior box-like containers, namely, that of insuring registration between printing on adjacent sides or panels of the box, arising from the fact that such adjacent sides are not necessarily contiguous with each other during the printing step or during the folding step.

After imprinting, the blank 50 may be separated from the large sheet 52 by die cutting. Vertical die cutting presses or roller cutting apparatus may be employed, which may also simultaneously impart the necessary fold and perforation lines. Separate processing steps may be used to provide the fold and perforation lines, if deired.

Figure 7:
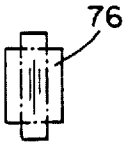
FIG. 7 and FIG. 8 show two different forms of pocket liners for use in providing a finished look by covering the exposed foam after the product is removed from the pocket.
Figure 8:
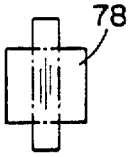
Figure 9:
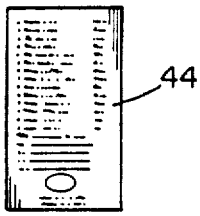
FIG. 9 is a top plan view of an order form employed with the container of the present invention.

FIGS. 7 through 12 illustrate the auxiliary components employed in forming the complete container 10. In FIGS. 7 and 8 two versions of pocket liners 76 and 78 respectively for insertion into the cavities 30 of the filler block 28 are shown, each having walls of different width and depth to match the cavity 30 and the product sample to be held. In FIG. 9 an order blank 44 for insertion within the pocket 40 is illustrated. Both the pocket liners 78 shown in FIGS. 7 and 8 as well as the order blank 44 shown in FIG. 9 may be separately made, although it is preferred that they be made from the same sheet of stock material simultaneously with the formation of the blank 50. For example, these components can all be located as outlined, in those areas of the sheet material 53 apart from the blank 50 so that they can be imprinted and cut simultaneously with the blank 50.

Figure 10:
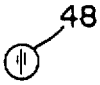
FIG. 10 is a top plan view of a pealable self-sticking seal.

FIG. 10 illustrates a peelable, self-sticking label 48 commonly used to hide indicia or to transfer indicia from one surface to another. Such self-sticking label can be used as the seal 48 to seal the reply envelope, as discussed earlier with regard to FIGS. 1 through 4. Preferably this seal is placed on the upper surface A of the right lateral wing 26 so as to be readily available to the consumer when needed.

Figure 11:
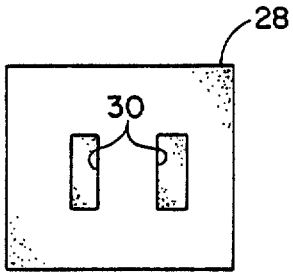
FIG. 11 is a top plan view of the filler body showing the cavities therein for the product.
Figure 12:
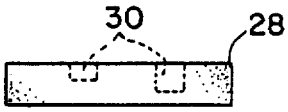
FIG. 12 is a front elevational view of the filler body seen in FIG. 11.

FIGS. 11 and 12 illustrate the monolithic filler block 28 which is preferably formed of a foam plastic, of any conventional composition so as to conform to the interior size of the box 10 and is formed with one or more of the cavities 30.

Figure 13:
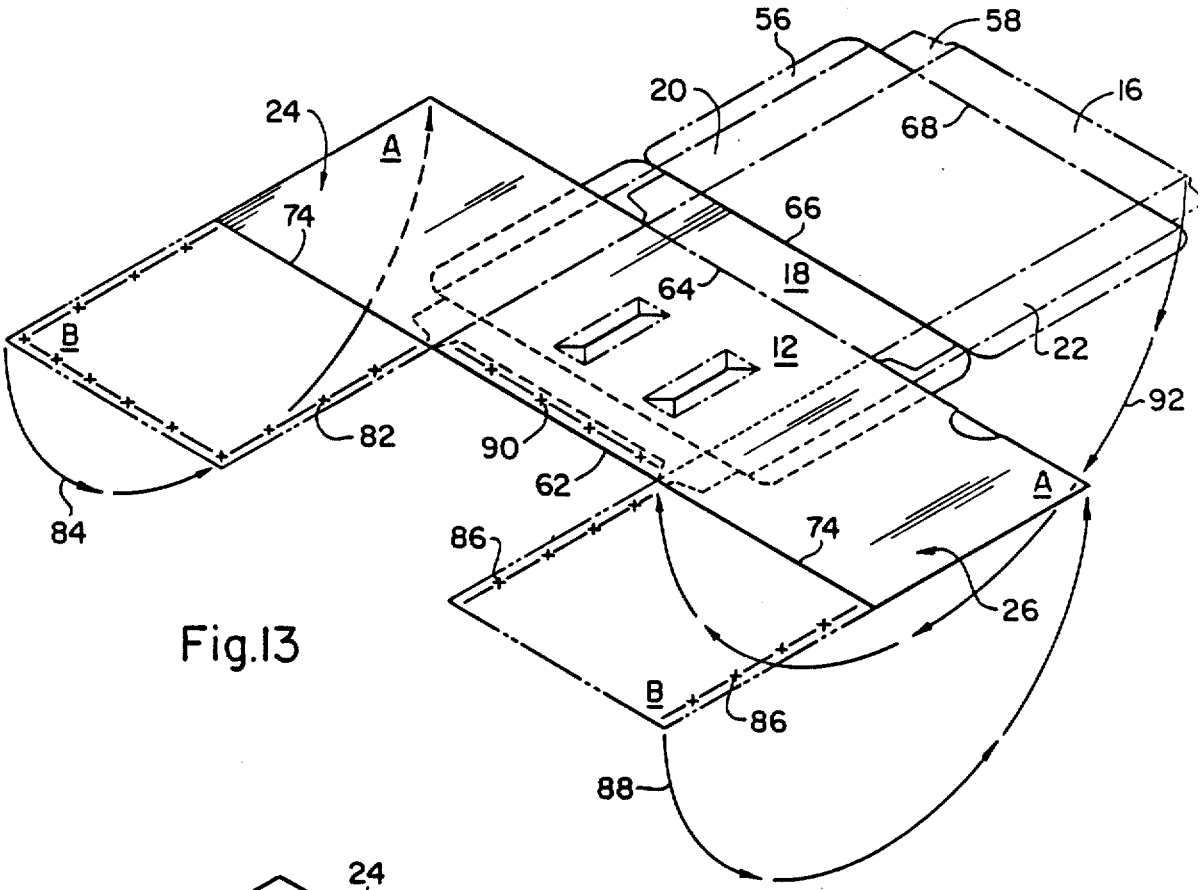
FIGS. 13 and 14 are top perspective views showing the folding of the blank into a preassembly without the filler body, enabling shipping in bulk.
Figure 14:
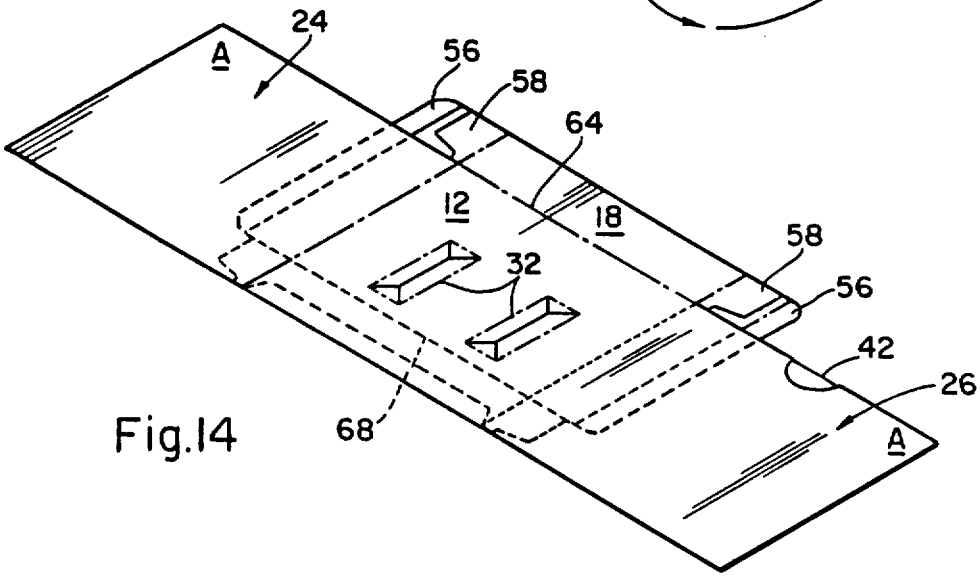
Figure 15:
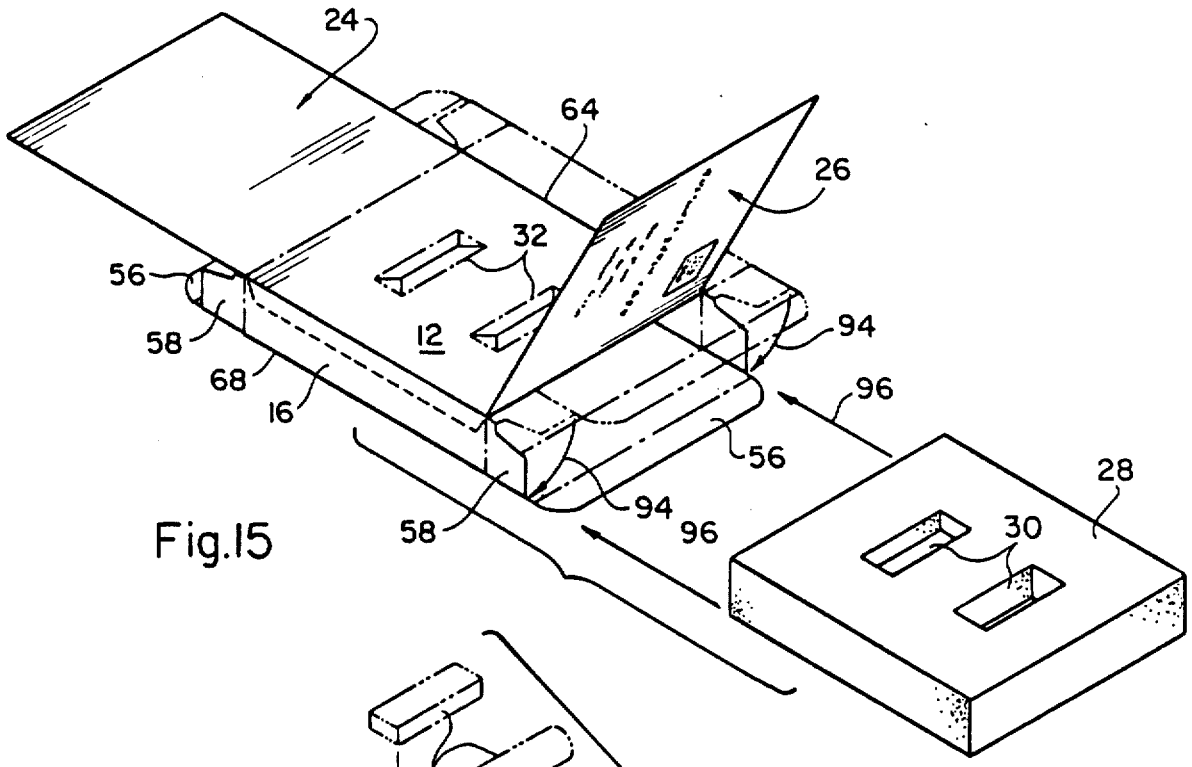
FIGS. 15 and 16 are top perspective views illustrating the sequence by which the preassembled container is erected, and the filler body and the product inserted therein.

Turning now to FIGS. 13 and 14, the stages by which the blank 50 is converted into a preassembled container, are ready for shipment in bulk, is illustrated.

Glue 82 is applied about the free peripheral edge of the underside of the lower member B of the left lateral wing 24 and this member is folded under, along the fold line 74, i.e. in the direction shown by the arrow 84, so that it lies flat against the unprinted side of upper surface member A of the left lateral wing 24. Similarly, glue 86 is applied to the unprinted surface of the lower surface member B of the right lateral wing 26 along its lateral peripheral edges, and this member B is folded under along the fold line 72, in the direction of arrow 88, against the unprinted face of the upper surface member A. No glue is applied along the upper and lower peripheral edges of either members A and B of the right lateral wing 26, which edges are to form the edge 40 of the container remaining open to form the pocket 42.

Once the left and right lateral wings 24 and 26 are securely glued, the central flap 54 is glued at 90 and then folded 180 degrees along the fold line 60. Therafter, the blank is folded along the fold line 64, in the direction of the arrow 92, carrying the bottom panel 14 and its appurtenant side panels below the display panel 12 placing the front side panel 16 in direct contact with the glued flap 54. Thus, as seen in FIG. 14, the partially assembled blank, the lateral side wings 24 and 26 are formed of a laminate of two sheets A and B and the box is arranged in knock-down position, comprises a flat, relatively small arrangement for easy stacking and shipping.

Figure 16:
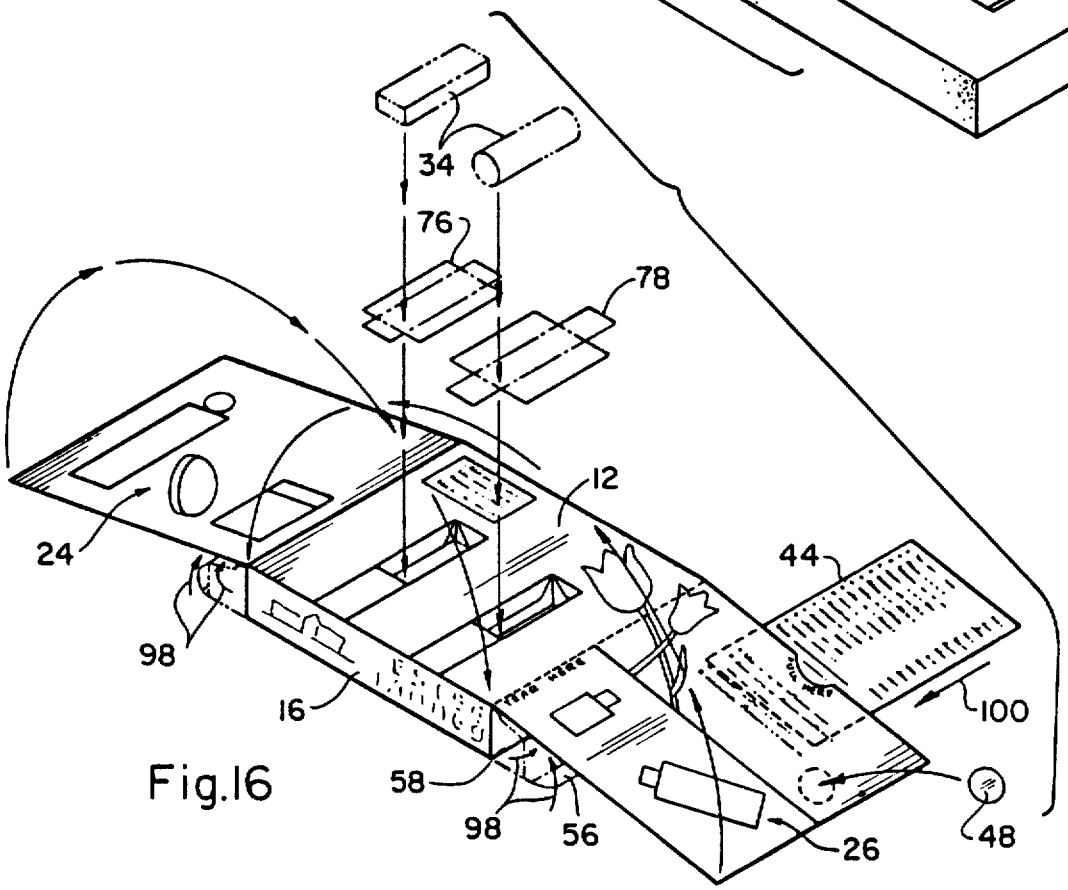

The erection of the box and its assembly with a product sample for final shipment is shown in FIGS. 16 to 18.

The knocked-down or partially assembled container 10 as shown in FIG. 14 is opened, by completing the formation of the front and rear side panels 16 and 18, by folding further along the fold lines 64 and 68 respectively in the direction of arrow 94. This opens each of the right and left side ends for the insertion of the filler block 28 in the direction of the arrows 94. The filler block 28 is inserted until the cavities 30 come into registry with the cut-out portions 32 within the central display panel 12. Thereafter, completion of the right and left side walls is effected by folding in the side and tuck flaps 56 and 58 in the direction of arrows 98, as would be conventional. Finally, the pocket liners 78 are folded and inserted into the cut-outs 32 in the central display panel 12 so that they seat firmly in the cavities 30 of the filler block 28 and then the product 34 are inserted therein. Lastly, the order form 80, and whatever other advertising or distribution material is to be employed, is inserted into the pocket 42 (arrow 100) and the seal 48 applied. Finally, the lateral side wings 24 and 26 are folded over each other, the right lateral wings 26 first so that the left lateral wing is on top, and the box is sealed by the tab 36.

Figure 3:
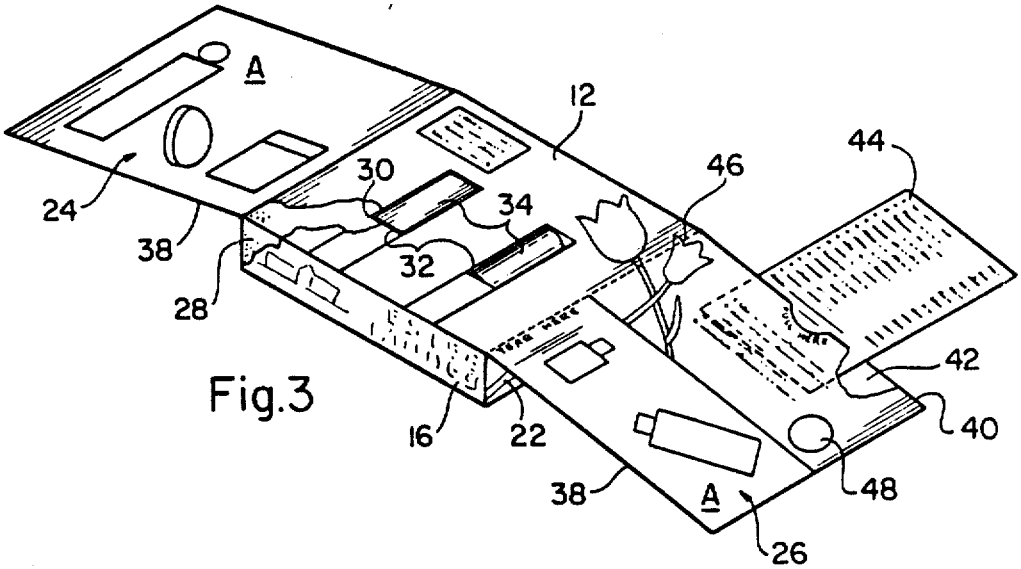
FIG. 3 is a perspective view showing the container in open condition and is partially cut away to show its interior.

This display and mailing container may be posted by regular post, or distributed or sold, or given away over the counter in any retail store, or for further example be a part of a hotel ammenities program. It would be obvious, that no matter how the container is used, it provides those features missing from the prior art as enumerated above and in particular full visibility for the product being advertised or sold through the openings in the central display panel 12, as well as ample space for advertising material, on both sides of the lateral wings. In the open and flat condition, as seen in FIG. 3, not only is the product readily observable to the user, but so is the advertising indicia and other decorative aspects of the container. By standing the container on its front side panel, the container provides a very agreeable and decorative display for direct horizontal viewing and for standing the product on countertops, table tops or the like. The container is structured so that the story of the product can be easily told more or less in book form on the upper surfaces of the lateral wings, as well as the central display panel 12. Further, the product is decoratively showcased in the three continuous and contiguous panels constituting the central display panel 12 and the lateral wings.

Of great advantage, is the fact that one of the lateral wings, may be employed as a reply envelope, in addition to the fact that it holds the written and advertising material in its pocket. This makes it very convenient for the customer to order or reorder any or all of the product lines being showcased. Further, providing the peelable seal, makes it easier for the customer to employ the packet. All of this is extremely important from a direct response perspective to advertising, as it allows for the placement of the direct response instructions in close juxtaposition to the actual product. The reply envelope is sufficiently large not only to contain the order form, but also for the inclusion of check or money order for the merchandise being requested.

The appearance of the box is greatly enhanced by the continguous central display panel 12, and the lateral side wings, since this enables the flow of the artwork, and the instructive material to be made without break, disjunction or lack of registry in either shape or color.

Various forms and modifications have been suggested herein, others will be obvious to those skilled in the art. Accordingly, it is intended that the present disclosure be taken as illustrative only of the invention and not limiting of its scope.

What is claimed:

1. A cardboard blank to be folded into a box for use in mailing product samples, said blank comprising a central panel delineated by upper and lower edges and opposite side edges and presenting a surface for imprinting product information on a flat surface thereof within the confines of said edges, a gluing tab extending from said lower edge and interconnected plural panels extending from said upper edge, said interconnected plural panels being adapted to be folded along said upper edge and beneath said central panel and to be adhesively secured to said gluing tab to form a box of said interconnected plural panels bounding a compartment beneath said central panel, a foam block sized to be positioned in said compartment and having at least one recess for a product sample, a cut-out in said central panel opening into said recess for positioning a product sample therein, and a pair of side panels each extending laterally from one said opposite side edges in contiguous relation to said central panel so as to present additional surfaces on opposite sides thereof for imprinting product information, said side panels being adapted to be folded in overlapped relation in one direction in closing movement upon said central panel and in opposite direction unfolding movement to present a display of said surfaces thereof in adjacent relation on opposite sides of said surface of said central panel, whereby any imprinting for completing said display can be applied simtultaneously to said blank in the flat within said surfaces of said side and central panels and automatically will be in registration across said opposite sides edges.

2. A blank to be folded into a box for use in mailing product samples, said blank comprising a flat sheet of carboard, pasteboard, or similar material delineating a central display panel and a central bottom panel, a first interconnecting panel contiguous to the upper edge of the central display panel and the lower edge of the central bottom panel, a tab extending from said lower edge of the control display panel and a second interconnecting panel extending from the upper edge of the central bottom panel, a pair of side panels extending from the lateral edges of said central bottom panel, and a pair of lateral side wing panels extending from the lateral side edges of the central display panel, said wing panels each substantially conforming in size to said central display panel, said blank being adapted to be folded along said edges and having said second interconnecting side panel adhesively secured to said tab to form a box bounding a compartment beneath said central display panel closable by said side panels and having the wing panels foldable in overlapping relationship over said central display panel, a foam block sized to be positioned in said compartment having at least one recess for a product sample, a cut-out in said central display panel opening into said recess for positioning a product sample therein, said blank being adpated in its flat condition for application of imprinting, decoration and application of indicia simultaneously on all ultimately visible surfaces within said central display and bottom panels and said side and interconnecting panels so that registration across said opposite side edges is automatically effective.

3. The blank according to claim 1 or 2, wherein additional panels for imprinting extend from a lower oriented edge of each of said wing panels and are adhesively secured in folded relation to the underside thereof, whereby in said overlapped relation of said side panels imprinting on said additional panels contributes to the display of the box.

4. The blank according to claim 3, wherein one of said additional panels is adhesively secured only along two edges so as to form a compartment between said secured panels for the removable insertion of printed matter associated with said product sample.

5. The blank according to claim 4, wherein the side edge connecting said one wing panel with said central display panel, is perforated to facilitate the removal thereof and subsequent commercial use as a mailing piece.

6. A cardboard blank to be folded into a box for use in mailing product samples, said blank comprising a central panel delineated by upper and lower edges and opposite side edges and presenting a surface for imprinting product information on a flat surface thereof within the confines of said edges, a gluing tab extending from said upper edge and interconnected plural panels extending from said lower edge, said interconnected plural panels being adapted to be folded along said upper edge and beneath said central panel and to be adhesively secured to said gluing tab to form a box of said interconnected plural panels bounding a compartment beneath said central panel, a [foam block sized to be] *crush-proofed product sample* positioned in said compartment [and having at least one recess for a product sample, a cut-out in said central panel opening into said recess for positioning a product sample therein], and a pair of side panels each extending laterally from one said opposite side edges in contiguous relation to said central panel so as to present additional surfaces on opposite sides thereof for imprinting product information, said side panels being adapted to be folded in overlapped relation in one direction in closing movement upon said central panel and in opposite direction unfolding movement to present a display of said surfaces thereof in adjacent relation on opposite sides of said surface of said central panel, whereby any imprinting for completing said display can be applied simultaneously to said blank in the flat within said surfaces of said side and central panels and automatically will be in registration across said opposite side edges.

* * * * *